(12) United States Patent
Lee et al.

(10) Patent No.: US 12,546,077 B2
(45) Date of Patent: Feb. 10, 2026

(54) DETACHABLE EDGE PROTECTOR FOR HARBOR

(71) Applicant: ULSAN PORT AUTHORITY, Nam-gu Ulsan (KR)

(72) Inventors: Sang Min Lee, Nam-gu Ulsan (KR); Sung Whan Won, Nam-gu Ulsan (KR)

( * ) Notice: Subject to any disclaimer, the term of this patent is extended or adjusted under 35 U.S.C. 154(b) by 0 days.

(21) Appl. No.: 18/548,935

(22) PCT Filed: Jan. 27, 2022

(86) PCT No.: PCT/KR2022/001432
§ 371 (c)(1),
(2) Date: Sep. 5, 2023

(87) PCT Pub. No.: WO2022/234927
PCT Pub. Date: Nov. 10, 2022

(65) Prior Publication Data
US 2024/0150986 A1    May 9, 2024

(30) Foreign Application Priority Data

May 4, 2021  (KR) .................. 10-2021-0057995

(51) Int. Cl.
*E02B 3/26*    (2006.01)
(52) U.S. Cl.
CPC ..................... *E02B 3/26* (2013.01)
(58) Field of Classification Search
CPC ................................. E02B 3/26; E02B 17/003
USPC .............................. 405/215; 14/76; 114/219
See application file for complete search history.

(56) References Cited

U.S. PATENT DOCUMENTS

| 4,946,727 | A | * | 8/1990 | Kessler | .................. | B32B 7/022 |
| | | | | | | 24/297 |
| 5,658,633 | A | * | 8/1997 | Di Biase | .................. | F16F 7/00 |
| | | | | | | 428/323 |
| 6,095,074 | A | * | 8/2000 | Reinhardt | ............... | B63B 59/02 |
| | | | | | | 405/215 |
| 6,832,570 | B2 | * | 12/2004 | Aschenbach | ............. | E02B 3/26 |
| | | | | | | 405/215 |

(Continued)

FOREIGN PATENT DOCUMENTS

| JP | 2003-313973 A | 11/2003 |
| JP | 3881585 B2 | 11/2006 |

(Continued)

OTHER PUBLICATIONS

ISR; Korean Intellectual Property Office; Apr. 22, 2022.

*Primary Examiner* — Frederick L Lagman
(74) *Attorney, Agent, or Firm* — Patshegen IP; Moshe Pinchas

(57) ABSTRACT

The present invention relates to a detachable harbor edge protector, and a detachable harbor edge protector according to an embodiment of the present invention includes a bottom plate of which a cross section is formed in a curved shape and which is fixed to a stepped ground surface, one or more fixing parts which fix the bottom plate to the ground surface, an upper cover detachably coupled to an upper portion of the bottom plate, and a side cover coupled to a side surface of the bottom plate. Accordingly, since the bottom plate and the upper cover are detachably formed, maintenance can be easily performed when damage occurs.

4 Claims, 4 Drawing Sheets

(56) References Cited

U.S. PATENT DOCUMENTS

| | | | | |
|---|---|---|---|---|
| 6,948,440 B2* | 9/2005 | Aschenbach | ............. | E02B 3/26 |
| | | | | 405/215 |
| 7,624,694 B2* | 12/2009 | Aschenbach | ........... | B63B 59/02 |
| | | | | 114/219 |
| 8,647,018 B2* | 2/2014 | DeMay | .................... | E02B 3/26 |
| | | | | 405/212 |
| 8,721,224 B2* | 5/2014 | Hough | ................... | B63B 59/02 |
| | | | | 405/215 |
| 8,814,475 B1* | 8/2014 | Landes | .................... | E02B 3/26 |
| | | | | 405/211 |

FOREIGN PATENT DOCUMENTS

| | | | | |
|---|---|---|---|---|
| KR | 10-0779268 B1 | 11/2007 | | |
| KR | 20-2011-0008191 U | 8/2011 | | |
| KR | 10-1568106 B1 | 11/2015 | | |
| KR | 10-1799872 B1 | 11/2017 | | |
| KR | 20180015818 A * | 2/2018 | | |
| KR | 10-2301212 B1 | 9/2021 | | |
| WO | WO-2012002604 A1 * | 1/2012 | ............... | E02B 3/26 |

\* cited by examiner

DETACHABLE EDGE PROTECTOR FOR HARBOR

BACKGROUND

1. Field of the Invention

The present invention relates to a detachable harbor edge protector, and more specifically, to a technology for protecting a harbor edge portion.

2. Discussion of Related Art

In the case of harbors, facilities to which ships dock should be provided. This is to allow the ships to safely dock in the harbors. In this case, the ships are fixedly connected to cables to prevent damage to the ships due to waves and the like. Edge portions of the harbors are damaged while the cables used to fix the ships are in contact with the edge portions. Several protectors have been developed to protect the edges of the harbors.

Among the related arts, Korean Public Utility Model Publication NO. 20-2011-0008191 (Published on Aug. 18, 2011) relates to an edge cover with a light lamp including a fixing mean of which one end is fixedly inserted into an edge, a main body installed on the edge and supported by the fixing mean, and a light-emitting lamp which is installed on one side of the main body and emits light.

However, the conventional technology has limitations that, in a case in which a lighting or the like is added to the main body, as the main body having an inner portion filled with a filler is used, heat is not dissipated, and thus there is a high failure risk, and a maintenance cost is high because the entire main body should be replaced when the main body is damaged due to ropes of the ships.

SUMMARY OF THE INVENTION

The present invention is directed to providing a detachable harbor edge protector which is easy to maintain in the case of damage because a bottom plate and an upper cover are detachably provided.

In addition, the present invention is directed to providing a detachable harbor edge protector in which a power line and the like are accommodated in an inner space and a short circuit is prevented by discharging rainwater through a drainage hole.

In addition, the present invention is directed to providing a detachable harbor edge protector which minimizes damage due to an external impact through a buffer that buffers and supports an upper cover from the bottom plate.

According to an aspect of the present invention, there is provided a detachable harbor edge protector including a bottom plate of which a cross section is formed in a curved shape and which is fixed to a stepped ground surface, one or more fixing parts which fix the bottom plate to the ground surface, an upper cover detachably coupled to an upper portion of the bottom plate, and a side cover coupled to a side surface of the bottom plate.

The bottom plate may be provided with a bottom surface in which a drainage hole is formed and an outer surface in which a drainage groove spaced apart from the ground surface is formed to discharge water.

The fixing parts may include a first fixing bolt which is inserted into and fixes a bottom surface of the bottom plate in a direction perpendicular to the ground surface and a second fixing bolt inserted into and fixes the side surface of the bottom plate in a direction parallel to the ground surface.

The detachable harbor edge protector may further include a lighting part which is coupled to one side of the bottom plate and emits light outward.

The detachable harbor edge protector may further include a buffer of which one side is connected to and supported by the bottom plate and the other side supports the upper cover to mitigate an external force applied to the upper cover.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments of the present invention will be described in detail with reference to the accompanying drawings. Terms described below are selected in consideration of functions in the embodiment and meanings may vary depending on, for example, a user or operator's intentions or customs. Therefore, in the following embodiments, when terms are specifically defined, the meanings of those terms should be interpreted based on those definitions, and otherwise, should be interpreted based on general meanings recognized by those skilled in the art.

Figure 1:
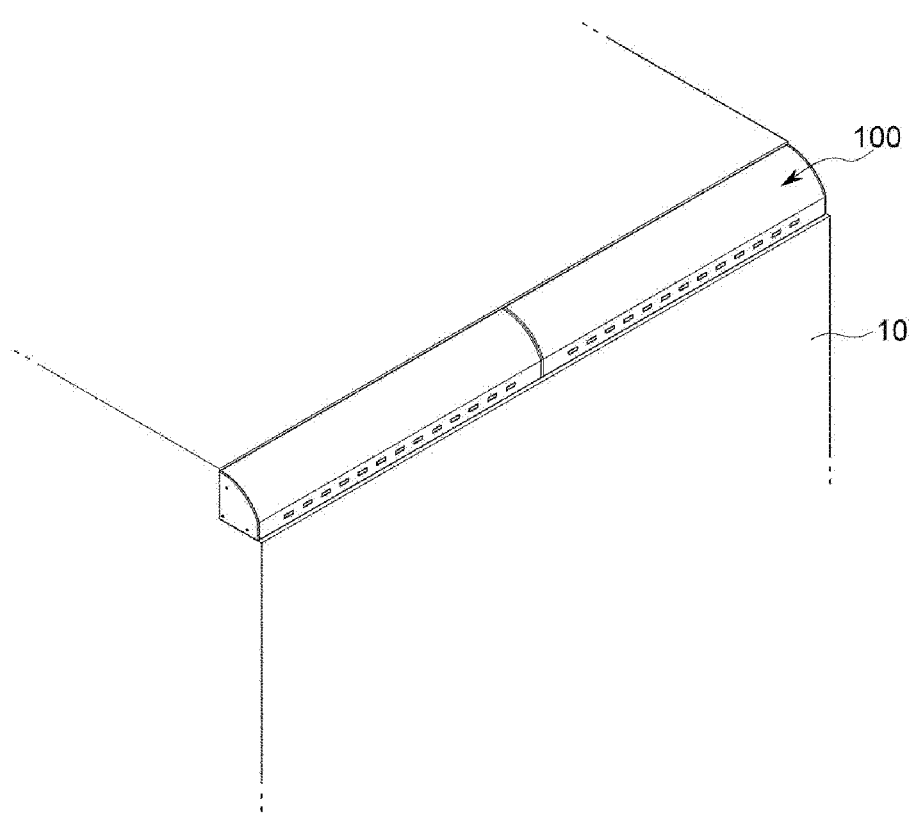
FIG. 1 is an exemplary view for describing a detachable harbor edge protector installed in a harbor according to an embodiment of the present invention.
Figure 2:
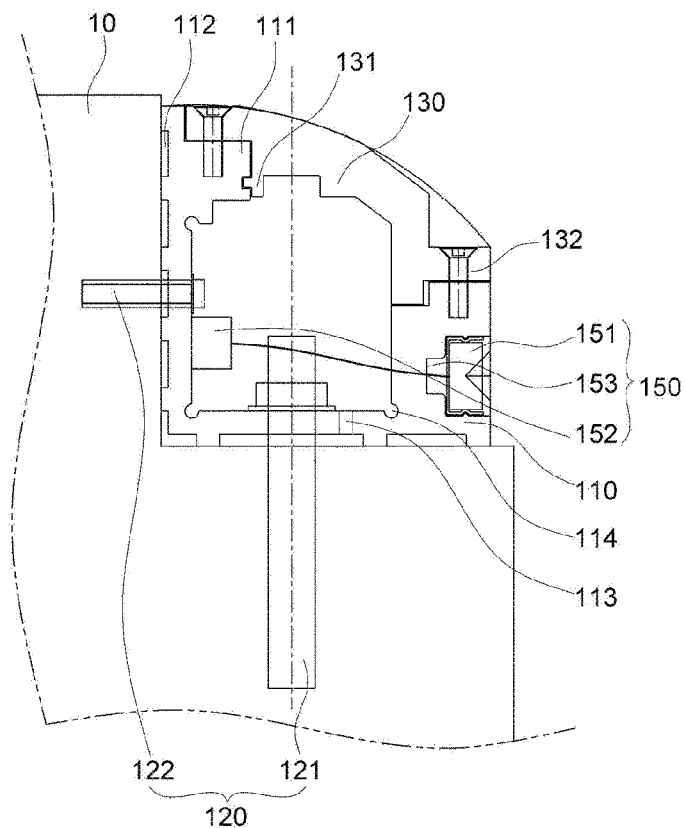
FIG. 2 is a configuration view illustrating the harbor in which the detachable harbor edge protector is installed according to FIG. 1.
Figure 3:
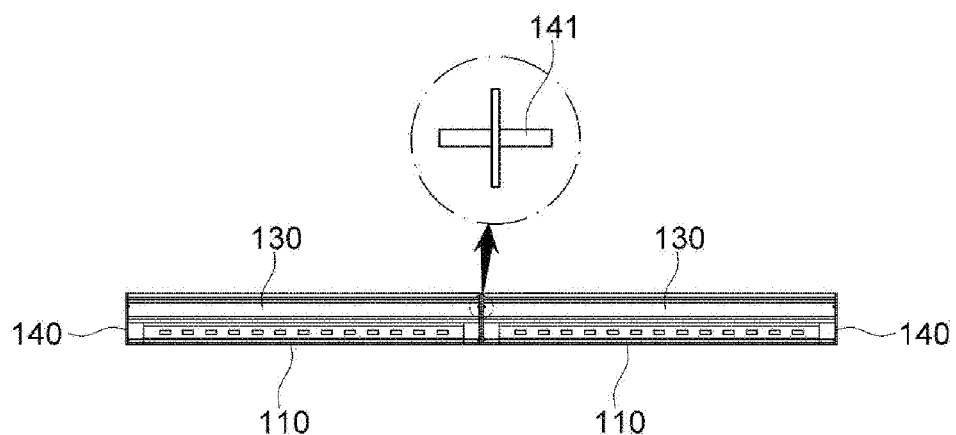
FIG. 3 is an exemplary view for describing detachable harbor edge protectors according to FIG. 1 that are connected and extended.

FIG. 1 is an exemplary view for describing a detachable harbor edge protector installed in a harbor according to an embodiment of the present invention, FIG. 2 is a configuration view illustrating the harbor in which the detachable harbor edge protector is installed according to FIG. 1, and FIG. 3 is an exemplary view for describing detachable harbor edge protectors according to FIG. 1 that are connected and extended.

Referring to FIGS. 1 to 3, a detachable harbor edge protector 100 according to the embodiment of the present invention includes a bottom plate 110, a fixing part 120, an upper cover 130, and side covers 140.

The bottom plate 110 is a metal frame and is formed so that a cross section of the bottom plate 110 has a bent shape. For example, the cross section of the bottom plate 110 may be formed with an "L" or "⌐" structure. In this case, the bottom plate 110 may be formed to have a predetermined length, and a plurality of bottom plates 110 may be connected to increase a length. A ground surface on which the bottom plate 110 is installed may be formed to be stepped as much as a width and a height of the bottom plate 110. This is to replace an edge portion of the ground surface with the detachable harbor edge protector 100 to prevent damage due to a lifting cable of a ship.

In addition, a first latch part 111 may be formed on one side of the bottom plate 110. The first latch part 111 is formed with a structure on which the upper cover 130, which will be described below, may be caught. Since the upper cover 130 is caught on the first latch part 111 when coupled to the bottom plate 110, the first latch part 111 may prevent the upper cover 130 from being easily separated from the bottom plate 110 due to an external impact. In other words, the first latch part 11 of the bottom plate 110 may maintain a coupled state between the bottom plate 110 and the upper cover 130 even without using a bolt. In this case, the upper cover 130 and the bottom plate 110 may be coupled in a sliding manner or coupled using a press-fitting structure, but the present invention is not necessarily limited thereto.

In addition, a drainage hole 112 may be formed in one side of the bottom plate 110, and a plurality of drainage grooves 113 may be formed in a bottom surface and a side surface of the bottom plate 110. When rainwater or seawater permeates through the bottom plate 110, the rainwater or seawater is discharged to the outside through the drainage hole 112. The drainage grooves 113 are each formed in a type of flow path for discharging the rainwater or seawater discharged through the drainage hole 112. In other words, the bottom surface and the side surface of the bottom plate 110 are partially spaced a predetermined distance from the ground surface to form the drainage grooves 113. In this case, positions and sizes of the drainage hole 112 and the drainage grooves 113 may be variously changed according to a design of a user.

In addition, a plurality of bolt holes 114 are formed in the side surface of the bottom plate 110. This is for coupling with the side cover 140, which will be described below, by bolts. The plurality of bottom plates 110 may be connected and used. To this end, the bottom plates 110 may be connected by connection pins 141. The connection pins 141 may connect the bottom plates 110 without the side covers 140. The connection pins 141 may each have protruding pins formed on both sides of the connection pin 141 and a stopper formed at a center of the connection pin 141. In this case, the adjacent bottom plates 110 are connected by the connection pins 141. Since the connection pins 141 may be coupled to the side surfaces of the bottom plates 110 in a sliding manner, installation can be performed simply.

The fixing part 120 fixes the bottom plate 110 to the ground surface. In this case, one or more fixing parts 120 may be provided. For example, the fixing parts 120 may each be implemented in the form of a drop-in anchor. In this case, screw heads of the fixing parts 120 may be formed in the ground surface, and bolts may be fixedly inserted into the screw heads through the bottom plate 110. This is to facilitate installation of the bottom plate 110 and to prevent an accident of cutting sheaths of internal power lines 153.

In addition, the fixing parts 120 may also be formed on a bottom surface and a side surface to fix the bottom plate 110. In this case, through holes through which the fixing parts 120 pass may be formed in the bottom plate 110. More specifically, the fixing parts 120 may include a first fixing bolt 121 and a second fixing bolt 122. The first fixing bolt 121 is inserted into the through hole in a direction perpendicular to the ground surface to fix the bottom surface of the bottom plate 110 to the ground surface. The second fixing bolt 122 is inserted into the through hole in a direction parallel to the ground surface to fix the side surface of the bottom plate 110 to a stepped side wall of a harbor 10. Accordingly, the bottom plate 110 may be fixed to the bottom surface and the side surface of the stepped ground surface to minimize damage due to an external force.

The upper cover 130 is detachably coupled to an upper portion of the bottom plate 110. More specifically, an outer side of the upper cover 130 may be formed in a curved shape. A second latch part 131 may be formed inside the upper cover 130. The second latch part 131 is formed in a shape engaged with and caught by the first latch part 111 of the bottom plate 110. The upper cover 130 is fixed when the first latch part 111 is caught on the second latch part 131. In this case, the upper cover 130 may be coupled to the bottom plate 110 in a sliding or press-fitting manner. Then, the upper cover 130 may be secondarily fixed to the bottom plate 110 by a cover bolt 132. Accordingly, the upper cover 130 can be firmly coupled to the bottom plate 110 due to the double coupling.

In addition, the upper cover 130 may be detachably connected to the bottom plate 110. This is to allow only the upper cover 130 to be replaced when the upper cover 130 is damaged by a cable connected to the ship. A reflection plate (not shown) may be formed on an outer surface of the upper cover 130. The reflection plate may reflect light at night to serve to guide the ship to dock when the ship docks. This is to allow the ship to dock at night without using lighting. In this case, the upper cover 130 may be coupled to the bottom plate 110 using the cover bolt 132. Accordingly, the upper cover 130 can be easily attached or detached.

The side covers 140 are coupled to side surfaces of the bottom plate 110. The side covers 140 serve to close both side surfaces of the bottom plate 110. The side covers 140 are fixedly bolt-coupled to a plurality of bolt holes 114 formed in the side surface of the bottom plate 110. The side covers 140 may be fastened while the side surfaces of the bottom plate 110 are coupled to the upper cover 130. A packing formed of a rubber material may be formed inside the side cover 140 to serve to prevent rainwater and the like from penetrating into an inner portion. A thickness of each of the side covers 140 may vary according to a design of the user.

Figure 4:
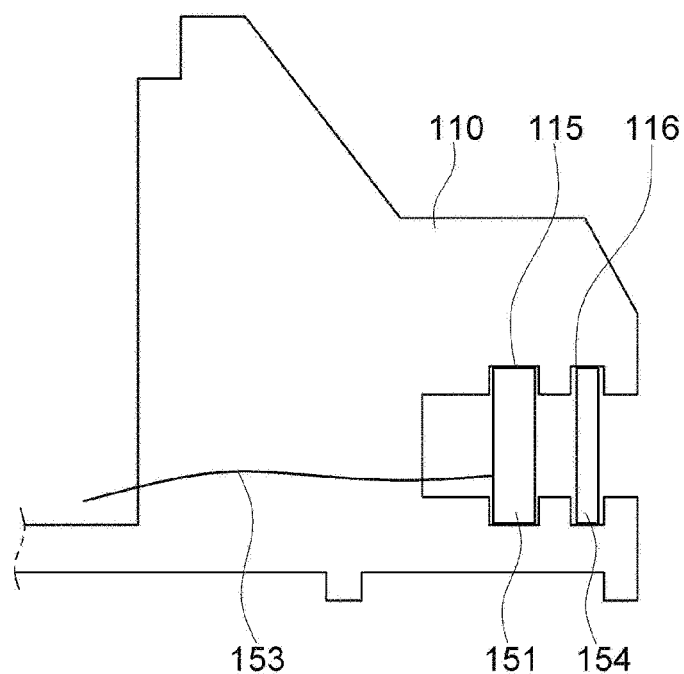
FIG. 4 is a detailed configuration view illustrating a lighting part of the detachable harbor edge protector according to FIG. 1.

FIG. 4 is a detailed configuration view illustrating a lighting part of the detachable harbor edge protector according to FIG. 1.

Referring to FIGS. 1 to 4, a detachable harbor edge protector 100 according to another embodiment of the present invention may further include a lighting part 150.

The lighting part 150 is coupled to one side of a bottom plate 110 and emits light outward. In this case, a lighting groove of which a cross-section has a "⊂" shape may be formed at one side the bottom plate 110 so that the lighting part 150 may be inserted into the lighting groove. The lighting part 150 may be formed as a rod-shaped light-emitting diode (LED) 151. This is to guide a ship approaching a harbor at night to easily dock. The LED 151 may be fixedly coupled to a side surface of the lighting groove in a sliding or press-fitting manner.

In addition, a control circuit 152 of the lighting part 150 is installed inside the bottom plate 110. In this case, a through hole is formed in the bottom plate 110 so that the power line 153 to which the LED 151 and the control circuit 152 are connected may pass through the through hole. The lighting part 150 may be connected to the power line 153 to receive external power. In this case, the power line 153 may be connected to the lighting part 150 in a parallel manner, and the power line 153 may be connected to the lighting part

150 along the inner side of the bottom plate 110. This is to simplify maintenance of the lighting part 150. Accordingly, when a plurality of bottom plates 110 are formed and extended, as power lines 153 are connected internally along the bottom plates 110, the power lines 153 may be connected to have a long length without a separate wiring rail.

In addition, the lighting part 150 may be formed with a protection plate 154 to prevent the degradation of the LED 151 due to sea wind or rainwater. The protection plate 154 is formed of a reflective material to reflect sunlight during the day, and thus the protection plate 154 may be visually identified. In this case, a first sliding groove 115 and a second sliding groove 116 may be formed in the bottom plate 110. In this case, the LED 151 may be coupled to the first sliding groove 115 in a sliding manner along a side surface of the first sliding groove 115. The protection plate 154 may be coupled to the second sliding groove 116 in a sliding manner along a side surface of the second sliding groove 116. Accordingly, the LED 151 may be spaced apart from the protection plate 154. This is to prevent the degradation of the protection plate 154 due to heat generated by the LED 151.

Figure 5:
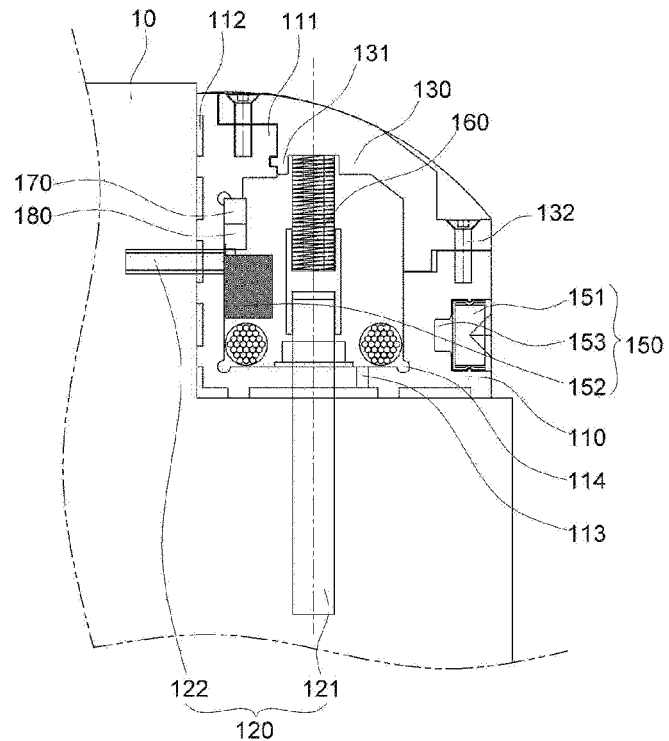
FIG. 5 is a configuration view illustrating the detachable harbor edge protector according to FIG. 1 to which a buffer is added.
Figure 6:
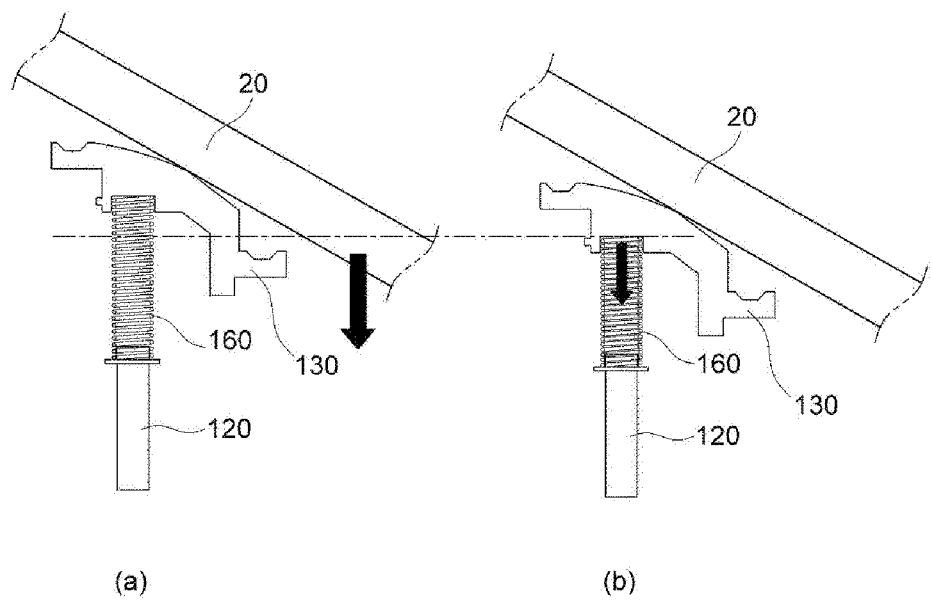
FIG. 6 is a set of exemplary views for describing that an impact is mitigated by the buffer of the detachable harbor edge protector according to FIG. 5.

FIG. 5 is a configuration view illustrating the detachable harbor edge protector according to FIG. 1 to which a buffer is added, and FIG. 6 is a set of exemplary views for describing that an impact is mitigated by the buffer of the detachable harbor edge protector according to FIG. 5.

Referring to FIGS. 1 to 6, a detachable harbor edge protector 100 according to still another embodiment of the present invention may further include a buffer 160.

The buffer 160 may be formed in the form of a compression spring. One side of the buffer 160 is connected to a fixing part 120, and the other side thereof is connected to an upper cover 130. More specifically, the buffer 160 is connected to a first fixing bolt 121 of the fixing part 120 and is supported perpendicular to a bottom plate 110. The buffer 160 is inserted into and supported by a buffer groove formed in the upper cover 130. In other words, the buffer 160 supports the upper cover 130 from the bottom plate 110 and buffers the upper cover 130 from being pressed by an external force. In this case, the bottom plate 110 is spaced a predetermined distance from the upper cover 130, and thus an impact of a cable 20 applied to the upper cover 130 may be mitigated by the buffer 160.

Meanwhile, the detachable harbor edge protector 100 according to still another embodiment of the present invention may further include a communication part 170.

The communication part 170 is formed inside the bottom plate 110 and communicates with an external communication terminal. The communication part 170 may receive a control signal from the external communication terminal. In this case, the control signal may control a lighting color, a lighting brightness, and a flickering cycle of a lighting part 150. This is to allow an administrator to remotely control a part or the entirety of the lighting part 150 through the communication terminal. Accordingly, after the detachable harbor edge protector 100 is installed, the lighting part 150 may be set to easily facilitate maintenance.

Meanwhile, the detachable harbor edge protector 100 according to still another embodiment of the present invention may further include a warning part 180.

The warning part 180 is formed inside the bottom plate 110 and outputs a warning signal. For example, the warning part 180 may be implemented as a speaker. In addition, the warning part 180 may output a warning signal through the lighting part 150. In addition, the warning part 180 may receive a warning signal from a remote communication terminal through the communication part 170 and output the warning signal. This is to warn of danger when a civilian approaches a control zone in which the detachable harbor edge protector 100 is installed. In this case, the warning signal can be implemented as a warning sound such as a siren or a warning voice. Accordingly, an accident can be prevented from occurring due a civilian approaching the detachable harbor edge protector 100 by mistake.

According to the detachable harbor edge protector, as a bottom plate and an upper cover are detachably formed, maintenance can be easily performed when damage occurs.

In addition, a power line and the like can be accommodated in an inner space, and rainwater can be discharged through a drainage hole to prevent a short circuit.

In addition, damage due to an external impact can be minimized through a buffer that buffers and supports an upper cover from a bottom plate.

Although the present invention has been mainly described through exemplary embodiments with reference to the accompanying drawings, the present invention is not limited thereto. Accordingly, the present invention should be interpreted through the description of the claims intended to encompass modifications that may be clearly derived from the described embodiments.

What is claimed is:

1. A detachable harbor edge protector (100) comprising:
   a bottom plate (110) of which a cross section is formed in a bent shape and which is fixed to a stepped ground surface;
   one or more fixing parts (120) which fix the bottom plate (110) to the ground surface;
   an upper cover (130) on which a second latch part (131) caught on a first latch part (111) of the bottom plate (110) is formed and which is detachably coupled to an upper portion of the bottom plate (110); and
   a side cover (140) coupled to a side surface of the bottom plate (110);
   wherein the fixing parts (120) include:
   a first fixing bolt (121) which is inserted into and fixes a bottom surface of the bottom plate (110) in a direction perpendicular to the ground surface; and
   a second fixing bolt (122) inserted into and fixes a side surface of the bottom plate (110) in a direction parallel to the ground surface.

2. The detachable harbor edge protector (100) of claim 1, wherein the bottom plate (110) is provided with:
   a bottom surface in which a drainage hole (112) is formed; and
   an outer surface in which a drainage groove (113) spaced apart from the ground surface is formed to discharge water.

3. The detachable harbor edge protector (100) of claim 1, further comprising a lighting part (150) which is coupled to one side of the bottom plate (110) and emits light outward.

4. The detachable harbor edge protector (100) of claim 1, further comprising a buffer (160) of which one side is connected to and supported by the bottom plate (110) and the other side supports the upper cover (130) to mitigate an external force applied to the upper cover (130).

* * * * *